(12) United States Patent
Miles

(10) Patent No.: US 6,451,237 B1
(45) Date of Patent: Sep. 17, 2002

(54) METHOD FOR MANUFACTURING FRONT FORK OF A CYCLE

(76) Inventor: Lynn Allan Miles, 1F, No. 8, Lane 319, Da Duen 6th Street, Nan Tun Chu, Taichung (TW), 408

( * ) Notice: Subject to any disclaimer, the term of this patent is extended or adjusted under 35 U.S.C. 154(b) by 39 days.

(21) Appl. No.: 09/659,048

(22) Filed: Sep. 11, 2000

(51) Int. Cl.$^7$ .......................... B09C 36/00; B09C 45/14
(52) U.S. Cl. ..................... 264/219; 264/275; 29/527.4; 250/279
(58) Field of Search ................................ 264/219, 250, 264/255, 271.1, 275, 279, 279.1; 280/276, 279; 29/527.1, 527.2, 527.4, 897.2

(56) References Cited

U.S. PATENT DOCUMENTS

| | | | | |
|---|---|---|---|---|
| 4,828,781 A | * | 5/1989 | Duplessis et al. | 264/250 |
| 5,016,895 A | * | 5/1991 | Hollingsworth | 280/280 |
| 5,039,470 A | * | 8/1991 | Bezin et al. | 264/255 |
| 5,078,417 A | * | 1/1992 | Mouritsen | 280/280 |
| 5,760,352 A | * | 6/1998 | Lee | 280/280 |
| 6,049,982 A | * | 4/2000 | Tseng | 29/897.2 |
| 6,109,638 A | * | 8/2000 | Colegrove | 280/288.3 |

* cited by examiner

*Primary Examiner*—Angela Ortiz
(74) *Attorney, Agent, or Firm*—Charles E. Baxley

(57) ABSTRACT

A method for manufacturing a front fork of a cycle includes forming and disposing a prototype in a mold cavity of a mold device for forming a peripheral space between the mold device and the prototype. A plastic material is then filled into the peripheral space formed between the mold device and the prototype for forming an outer protective layer on the prototype. The sharp edges and projections and/or the dirt and the greasy materials are preferably removed from the prototype before the outer protective layer is formed on the prototype of the front fork.

1 Claim, 4 Drawing Sheets

METHOD FOR MANUFACTURING FRONT FORK OF A CYCLE

BACKGROUND OF THE INVENTION

1. Field of the Invention

The present invention relates to a method, and more particularly to a method for manufacturing the front forks of cycles.

2. Description of the Prior Art

Typically, the parts or the elements of the cycle, particularly the front forks of the cycles are made of metal materials, including such as iron, steel, aluminum, alloy, and the like. For example, for the front forks made of iron or steel or alloy material, one or more tubular or planer materials are required to be cut, hammered, forged, and welded in order to form the prototype of the front fork. In order to prevent the front fork from being rusted, the prototype is required to be further treated with such as the grinding, and the trimming, and the polishing processes, etc. Particularly, the joints or the coupling portions formed by welding processes may include sharp edges or projections that are required to be ground and polished, in order to prevent the sharp edges or projections from hurting people. Thereafter, the ground or polished prototype is required to be electroplated with a beautiful outer layer and/or required to be sprayed with a painting layer. The cost for the iron or steel materials may be cheap, but, a number of manufacturing processes and man powers are required and may decrease the competition of the product. In addition, the electroplating process and/or the painting process may pollute our environment.

For front forks made of aluminum or alloy material, the front forks may be formed with a beautiful and smooth outer appearance by a molding or injection process. However, the cost for the aluminum material may be more expensive than that of the iron or steel materials such that the aluminum front forks are also less competitive.

The present invention has arisen to mitigate and/or obviate the afore-described disadvantages of the conventional front fork manufacturing methods.

SUMMARY OF THE INVENTION

The primary objective of the present invention is to provide a method for manufacturing the front forks of cycles with cheaper materials and having an excellent outer appearance.

In accordance with one aspect of the invention, there is provided a method for manufacturing a front fork of a cycle includes forming a prototype of the front fork with a cheaper iron or steel or alloy material, and disposing the prototype of the front fork in a mold cavity of a mold device. The prototype of the front fork is smaller than that of the mold cavity of the mold device for forming a peripheral space between the mold device and the prototype of the front fork. A plastic material is then filled or injected into the peripheral space formed between the mold device and the prototype of the front fork for forming an outer protective layer on the prototype of the front fork.

The sharp edges and projections and/or the dirt and the greasy materials are preferably removed from the prototype of the front fork before the outer protective layer is formed on the prototype of the front fork.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
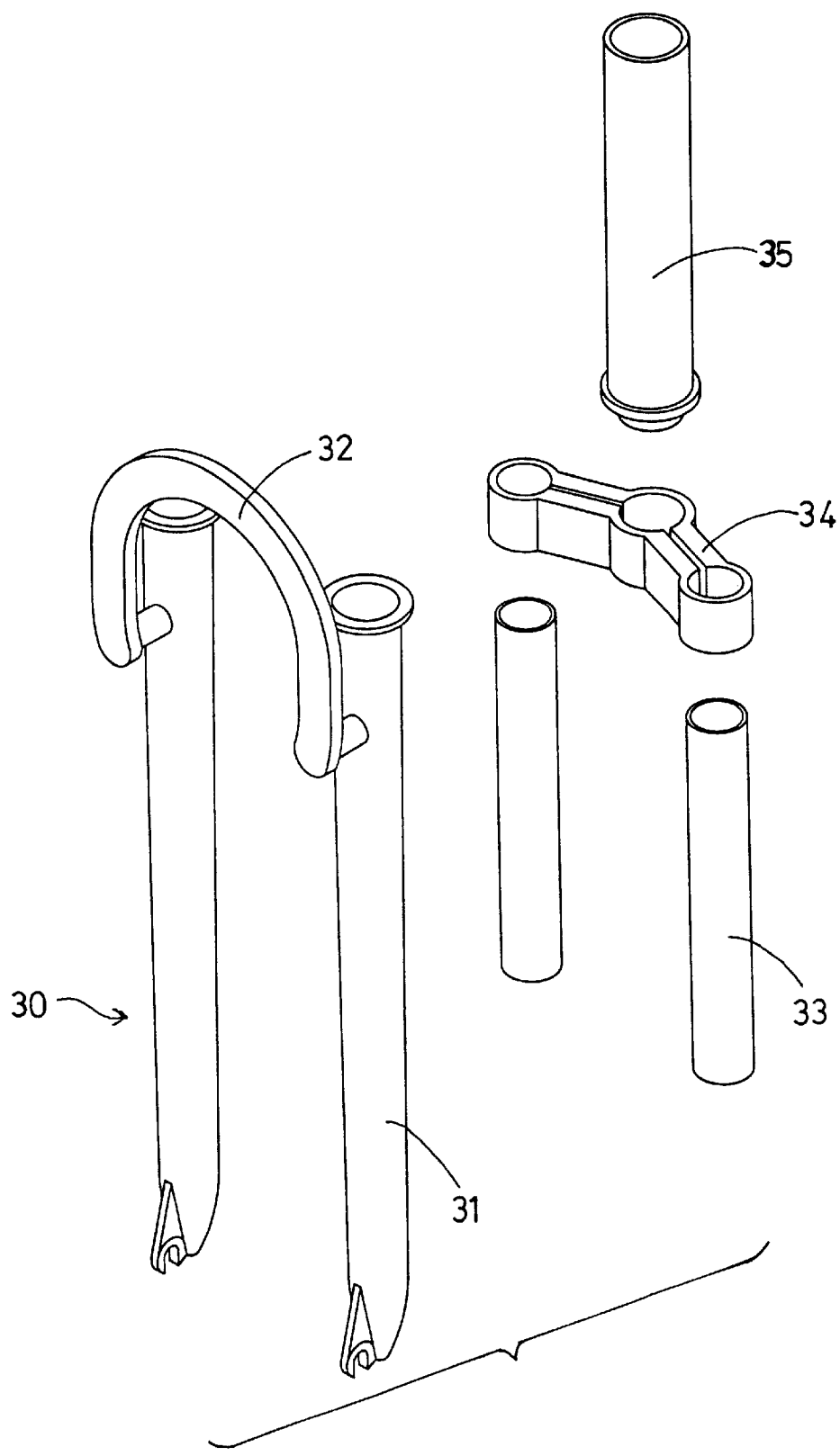
FIG. 1 is an exploded view of a front fork, particularly a suspension fork to be manufactured with a method in accordance with the present invention.
Figure 5:
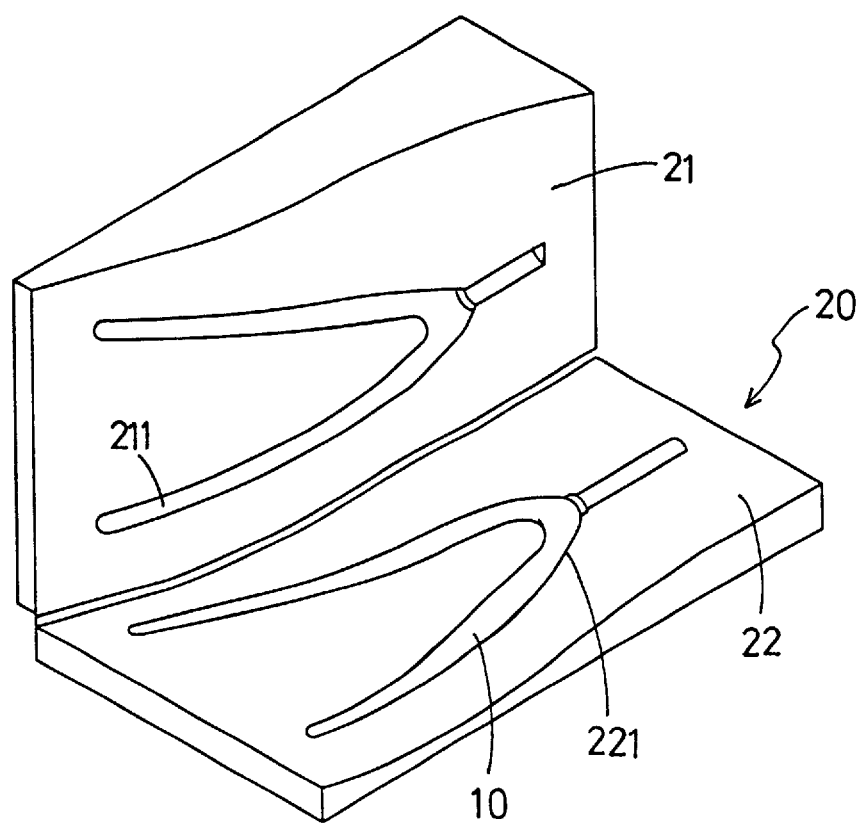
FIG. 5 is a perspective view illustrating the molding processes of the method for manufacturing a one-integral piece front fork.

Referring to the drawings, and initially to FIGS. 1 and 5, a method in accordance with the present invention is provided for manufacturing the front forks of cycles with cheaper materials and having an excellent outer appearance. The front fork may be a suspension fork 30 as shown in FIG. 1, or may be a one-integral piece front fork 10 as shown in FIG. 5. Please refer to FIG. 1, the suspension fork 30 includes a pair of lower tubes 31 having an upper portion secured together with a link, an arch 32 or the like, and includes a pair of upper tubes 33 slidably received in the lower tubes 31 respectively, and includes a crown 34 secured between the upper ends of the upper tubes 33, and includes a stem 35 secured to the crown 34 and extended upward from the crown 34. The lower tubes 31 and the upper tubes 33 and the crown 34 and the stem 35 may be formed or manufactured separately and may then be assembled together thereafter.

Figure 2:
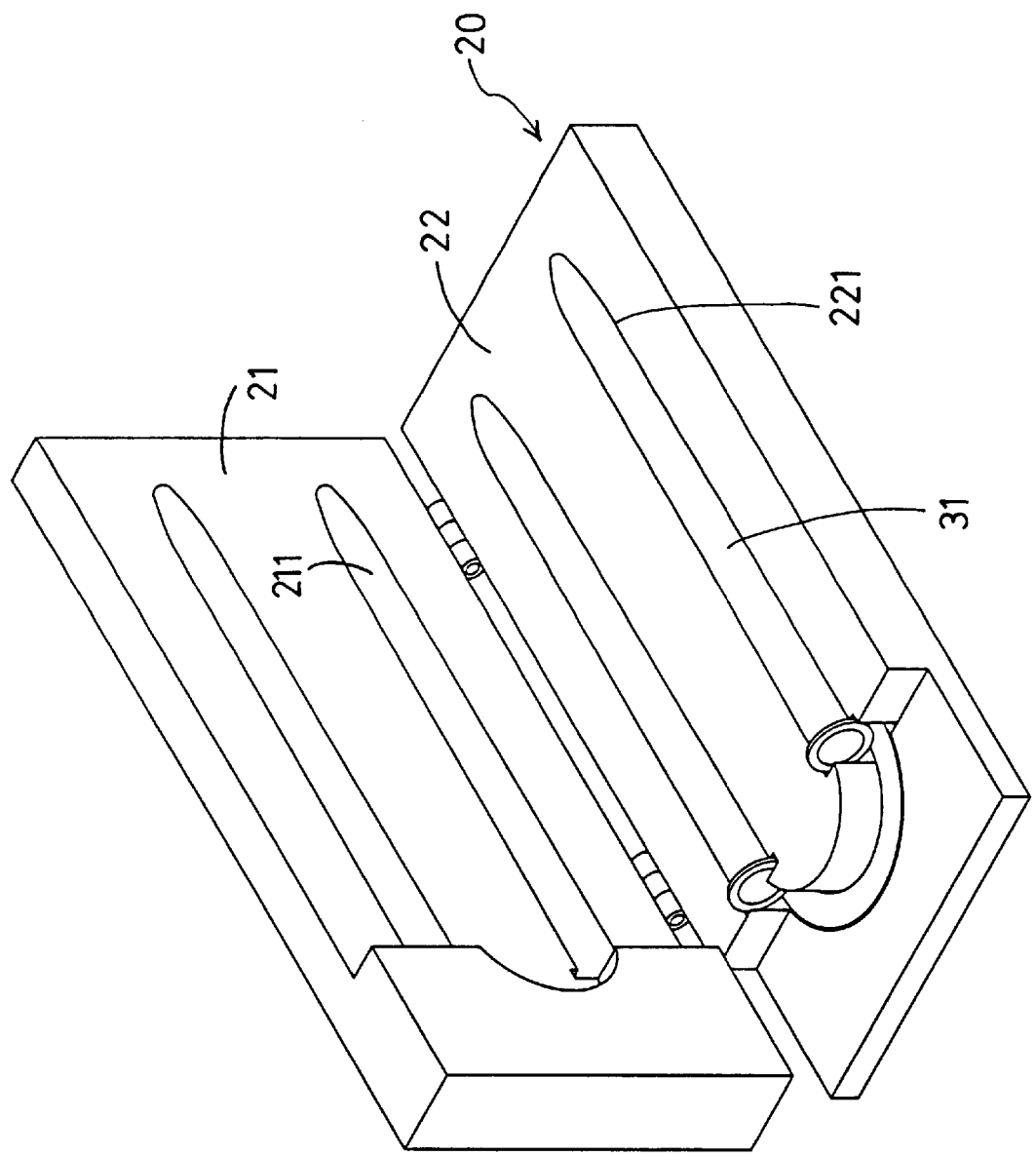
FIGS. 2 and 3 are perspective views illustrating the molding processes of the method.
Figure 3:
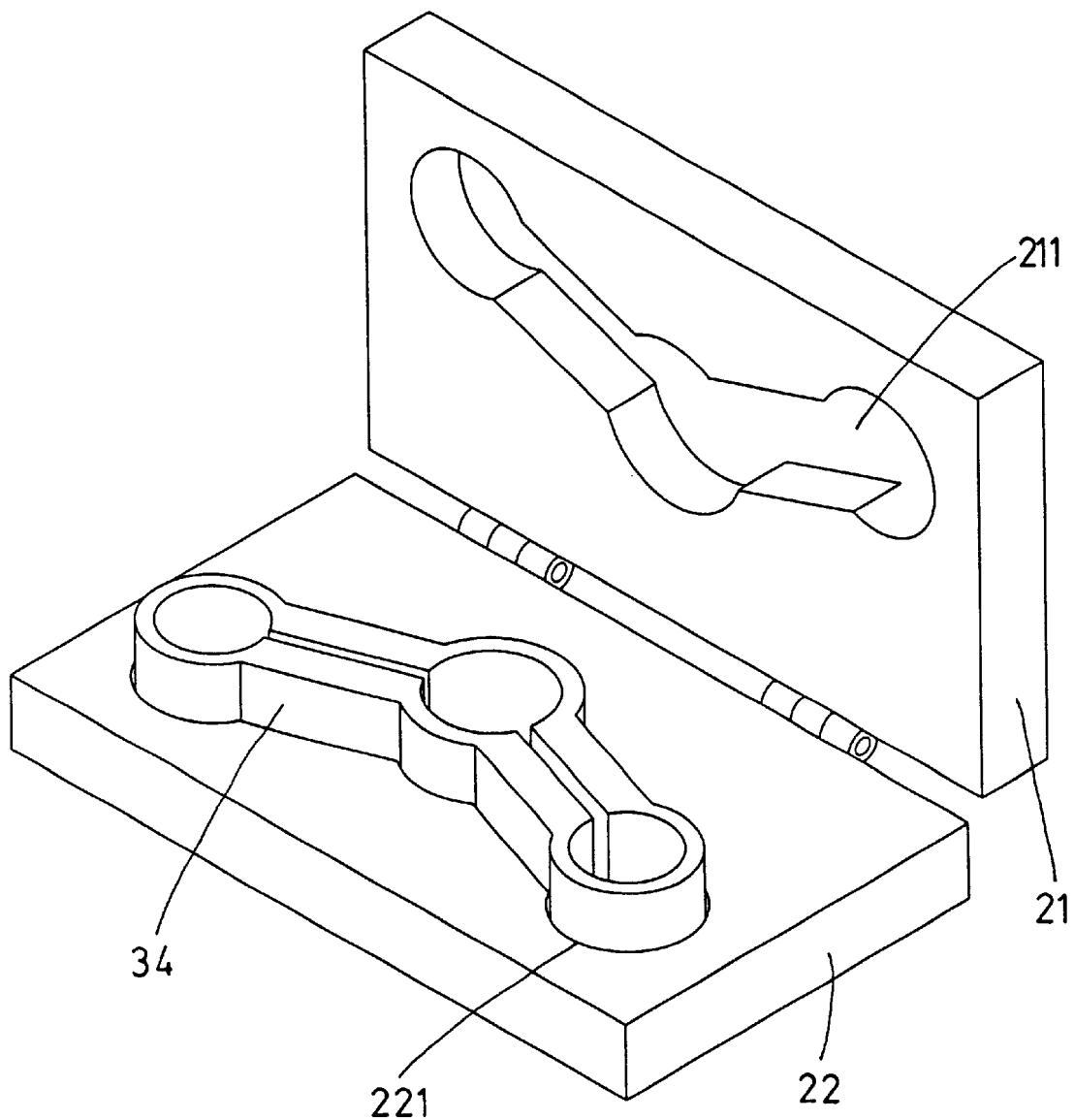
Figure 4:
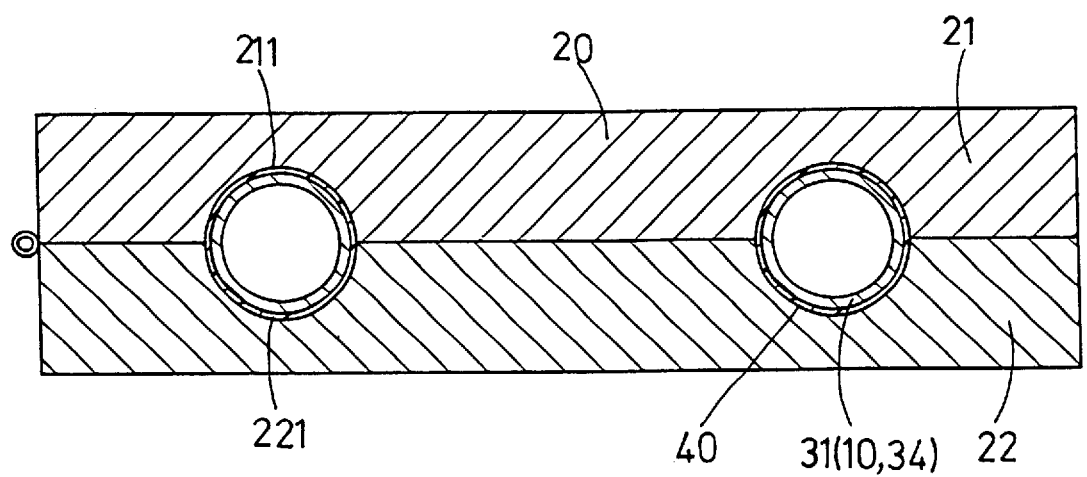
FIG. 4 is a cross sectional view illustrating the molding processes of the method having the parts or elements of the front fork received in the mold device.

The one-piece front fork 10 (FIG. 5), or the lower tubes 31 (FIGS. 1, 2, 4), or the crown 34 (FIGS. 1, 3), or the stem 35 (FIG. 1) may be formed or manufactured into a prototype with the iron or steel or alloy material that is cheaper than the aluminum or the other expensive materials. The waste aluminum of a cheaper cost may also be used for manufacturing the prototype of the parts or elements or the front fork. The prototypes of the front fork 10 or of the cycle parts 31, 34, 35 are then applied with an outer protective layer by such as the molding process and with such as the plastic materials having various kinds of colors. For example, as shown in FIGS. 2–4, one or more mold devices 20 may be provided for molding or for forming the one-piece front fork 10 (FIG. 5) or the cycle parts 31, 34, 35. The mold devices 20 each includes an upper mold member 21 and a lower mold member 22 each having a mold cavity 211, 221 formed therein and corresponding to that of the prototypes of the front fork 10 or the cycle parts 31, 34, 35 for receiving the front fork 10 or the cycle parts 31, 34, 35 therein respectively. The prototypes of the front fork 10 or the cycle parts 31, 34, 35 include a size smaller than that of the mold cavities 211, 221 of the mold device 20 for forming a peripheral space between the mold device 20 and the prototypes of the front fork 10 or the cycle parts 31, 34, 35.

The plastic materials having various kinds of colors are then injected or filled into the peripheral spaces formed or defined between the mold device 20 and the respective prototypes of the front fork 10 or the cycle parts 31, 34, 35 by such as the molding or the injecting process, so as to form the outer protective layer 40 (FIG. 4) on the outer peripheral portion of the prototypes of the front fork 10 or the cycle parts 31, 34, 35. It is preferable that the sharp edges or projections formed on the parts or elements are preferably removed, and the prototypes of the front fork 10 or the cycle parts 31, 34, 35 are preferably cleaned to remove the dirt and/or the greasy materials from the prototypes of the front fork 10 or the cycle parts 31, 34, 35 before the outer protective layer 40 is applied onto the prototypes of the front fork 10 or the cycle parts 31, 34, 35, for allowing the outer protective layer 40 to be solidly or fixedly applied and attached onto the prototypes of the front fork 10 or the cycle parts 31, 34, 35.

It is to be noted that the prototypes of the front fork 10 or the cycle parts 31, 34, 35 may be roughly made with the cheaper materials, such as the iron, without being finely ground, polished etc. It is only required to remove some of the sharp edges or projections formed on the parts or elements. The other sharp edges or projections formed on the parts or elements of a relatively smaller size are not required to be removed and may be covered or shielded by the outer protective layer 40. The outer protective layer 40 may form an excellent and beautiful and smooth outer appearance to the front fork of the cycle. The front fork of the cycle may thus be manufactured easily and quickly with cheaper materials, and may be applied with various kinds of colors by changing the colors of the plastic materials. In addition, a greatly decreased man power is required for manufacturing such a front fork of the cycle.

It is to be noted that the material, particularly the plastic material injected over the steel or iron or alloy or the like may be changed in color, density, and texture creating effects that are unapplicable when using the steel, the iron or the alloys thereof. The outer protective layer 40 may also be made with a suitable or selected hardness, and may be provided for shock absorbing purposes, or may be used for changing the structures of the parts or the elements or the front forks. texture purposes. These effects are also unapplicable when using the steel, the iron or the alloys thereof.

Accordingly, the method in accordance with the present invention may be used for manufacturing the front forks of cycles with cheaper materials and having an excellent outer appearance.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a front fork of a cycle, said method comprising:

a) forming a prototype of the front fork of the cycle with metal material;

b) preparing a mold device having a mold cavity formed therein corresponding to said metal prototype of said front fork;

c) disposing said metal prototype of said front fork in said mold cavity, said metal prototype of said front fork being smaller than that of said mold cavity of said mold device for defining a peripheral space between said mold device and said metal prototype of said front fork; and d) filling a plastic material into said peripheral space defined between said mold device and said metal prototype of said front fork for forming an outer protective layer on said metal prototype of said front fork.

\* \* \* \* \*